Figure 1:
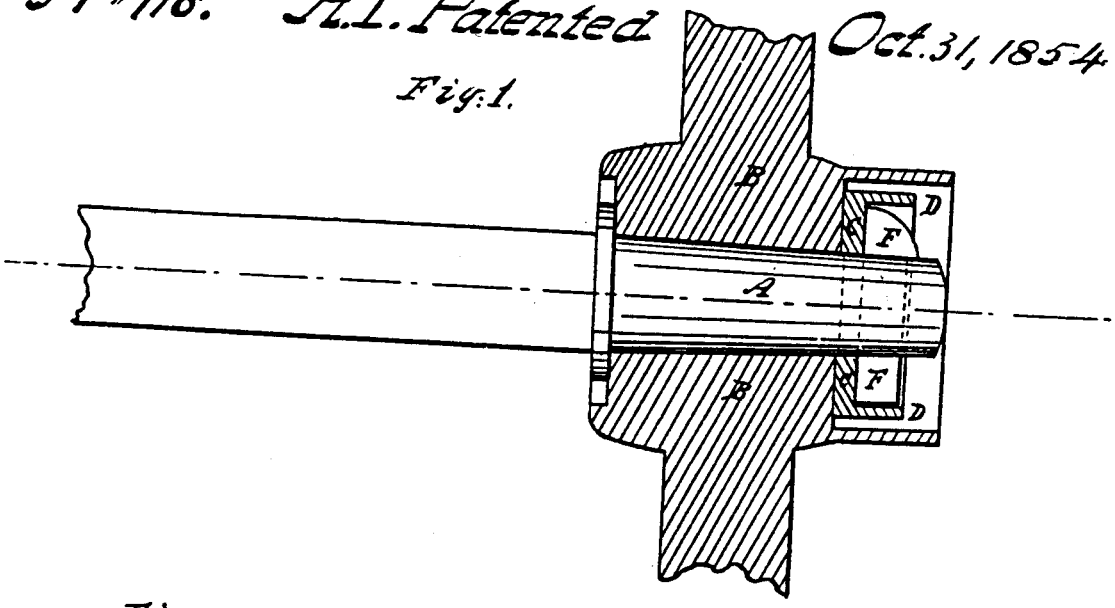
Figure 2:
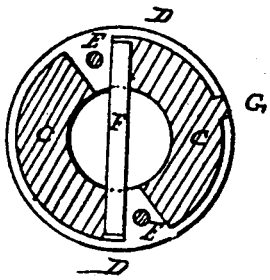
Figure 3:
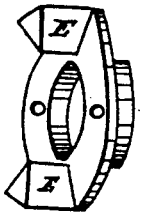
Figure 4:
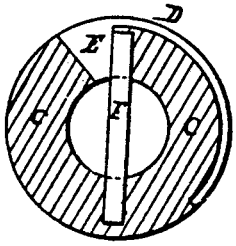
Figure 5:
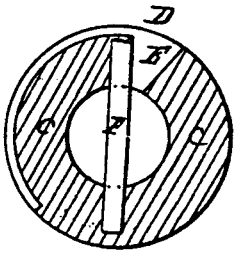

Sheet 1. 2 Sheets.

W. Thornley.
Attach'g Hubs to Axles.

No. 116. A.I. Patented Oct. 31, 1854

No. 116, to original Letters Patent No. 11,705.—*Improved Safety Washer for Securing Wheels to Axles.*

This improvement consists in making a safety washer without that portion of the flange standing at right angles with the linch-pin slot.

WM. THORNLEY.

2 Sheets—Sheet 2.
W. THORNLEY.
Attaching Hubs to Axles.
No. 116. A. I. Patented Oct. 31, 1854.
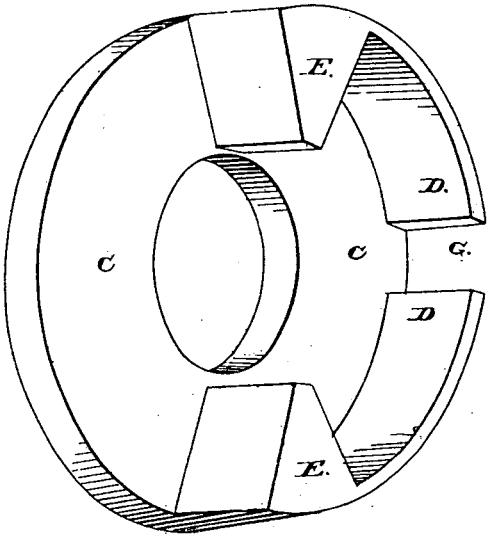
N. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 116 FOR THE ISSUE DATE 10/31/1854 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims